United States Patent
Miranda et al.

(10) Patent No.: US 11,972,221 B2
(45) Date of Patent: *Apr. 30, 2024

(54) SYSTEMS AND METHODS FOR GENERATING DYNAMIC CONVERSATIONAL RESPONSES USING MACHINE LEARNING MODELS

(71) Applicant: Capital One Services, LLC, McLean, VA (US)

(72) Inventors: Victor Alvarez Miranda, McLean, VA (US); Rui Zhang, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,196

(22) Filed: Apr. 24, 2023

(65) Prior Publication Data
US 2023/0267280 A1  Aug. 24, 2023

Related U.S. Application Data

(63) Continuation of application No. 16/986,207, filed on Aug. 5, 2020, now Pat. No. 11,663,418.

(51) Int. Cl.
G06F 40/35 (2020.01)
G06F 3/04883 (2022.01)
G06N 20/00 (2019.01)
G06Q 20/10 (2012.01)
H04L 51/02 (2022.01)

(52) U.S. Cl.
CPC ............. *G06F 40/35* (2020.01); *G06N 20/00* (2019.01); *G06Q 20/108* (2013.01); *H04L 51/02* (2013.01); *G06F 3/04883* (2013.01)

(58) Field of Classification Search
CPC ..... G06F 40/35; G06F 3/04883; G06N 20/00; G06N 3/084; G06Q 20/108; H04L 51/02
See application file for complete search history.

(56) References Cited

U.S. PATENT DOCUMENTS

| | | | |
|---|---|---|---|
| 2018/0367484 A1* | 12/2018 | Rodriguez | H04L 51/10 |
| 2019/0222540 A1* | 7/2019 | Relangi | H04M 3/42042 |
| 2020/0244700 A1* | 7/2020 | Moon | G06F 40/35 |
| 2021/0049210 A1* | 2/2021 | Otsuka | G06F 16/9038 |

* cited by examiner

*Primary Examiner* — Michelle M Koeth
*Assistant Examiner* — Paul J. Mueller
(74) *Attorney, Agent, or Firm* — Perkins Coie LLP

(57) ABSTRACT

Methods and systems are described for generating dynamic conversational responses using machine learning models. The dynamic conversational responses may be generated in real time and reflect the likely goals and/or intents of a user. The machine learning model may provide these features by monitoring one or more user actions and/or lengths of time between one or more user actions during conversational interactions.

16 Claims, 5 Drawing Sheets

SYSTEMS AND METHODS FOR GENERATING DYNAMIC CONVERSATIONAL RESPONSES USING MACHINE LEARNING MODELS

CROSS-REFERENCE TO RELATED APPLICATIONS

This application is a continuation of U.S. patent application Ser. No. 16/986,207, filed Aug. 5, 2020. The content of the foregoing application is incorporated herein in its entirety by reference.

FIELD OF THE INVENTION

The invention relates to generating dynamic conversational responses using machine learning models.

BACKGROUND

In recent years, the amount and uses of interactive programs has risen considerably. In tandem with this rise is the need to have human-like interactions and/or create applications that mimic the tone, cadence, and speech patterns of humans. Additionally, in order to fulfill user-interaction requirements, these applications need to be helpful, and thus respond intelligently by providing relevant responses to user inputs, whether these inputs are received via text, audio, or video input.

SUMMARY

Methods and systems are described herein for generating dynamic conversational responses. Conversational responses include communications between a user and a system that may maintain a conversational tone, cadence, or speech pattern of a human during an interactive exchange between the user and the system. The interactive exchange may include the system responding to one or more user actions (or inactions) and/or predicting responses prior to receiving a user action. In order to maintain the conversational interaction during the exchange, the system must generate responses that are both timely and pertinent (e.g., in a dynamic fashion). This requires the system to determine both quickly (i.e., in real-time or near real-time) and accurately the intent, goal, or motivation behind a user input. These user input or actions may take various forms include speech commands, textual inputs, responses to system queries, and/or other user actions (e.g., logging into a mobile application of the system). In each case, the system must aggregate information about the user action, information about the user, and/or other circumstances related to the user action (e.g., time of day, previous user actions, current account settings, etc.) in order to determine a likely intent of the user.

In order to determine the likely intent and generate a dynamic conversational response that is both timely and pertinent, the methods and systems herein use one or more machine learning models. For example, the methods and system may use a machine learning model in which information about the user action is used to generate a feature input for the machine learning model. This feature input is then input into the machine learning model to generate conversational responses. For example, the feature input may include information about the user action, information about the user, and/or other circumstances related to the user action (e.g., time of day, previous user actions, current account settings, etc.). The feature input (e.g., a vector of data) may express the information quantitatively or qualitatively. Moreover, feature inputs for similar intents (e.g., a first intent of a user to learn his/her maximum credit limit and a second intent of a user to learn a current amount in his/her bank account) may have similar feature inputs as much of the underlying information may be the same. Accordingly, the system may generate training data for a machine learning model (e.g., based on known intents and labeled feature inputs), and generate responses based on this trained model.

However, initial training data for different scenarios may be sparse, and the training data that is available may have biases introduced as part of the automation of the response. For example, in conventional systems, particularly those in which automatic responses are generated, there is a bias towards generating responses immediately upon a user action being received. That is, upon receiving a user input (e.g., representing a user action), conventional systems immediately retrieve available information and generate a response. While such a process is efficient and in-line with traditional machine logic, such a process diverges from human-to-human conversational interactions. For example, in human-to-human conversational interactions, pauses before and after a user action may indicate a user's level of uncertainty in the action and/or intent. In another example, a cadence of a series of interactions may indicate a confidence and/or accuracy of the actions and responses.

The methods and system described herein improve over conventional systems by monitoring for lengths of time (and/or other characteristics) related to user actions and generating conversational response based on this information. Moreover, the system may use this information for generating feature inputs for both training a machine learning model as well as using the machine learning model to determine user intent and/or generate conversational responses.

In some aspects, the method or system may generate dynamic conversational responses using machine learning models. For example, the system may receive a first user action from a first user, during a conversational interaction with a user interface. The system may monitor for a second user action during the conversational interaction with the user interface. While monitoring for the second user action, the system may determine a first length of time since the first user action. The system may generate a first feature input based on the first user action and the first length of time. The system may input the first feature input into a first machine learning model, wherein the first machine learning model is trained to select a dynamic conversational response from a plurality of dynamic conversational responses based on the first feature input. The system may generate, at the user interface, the dynamic conversational response selected by a machine learning model during the conversational interaction.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
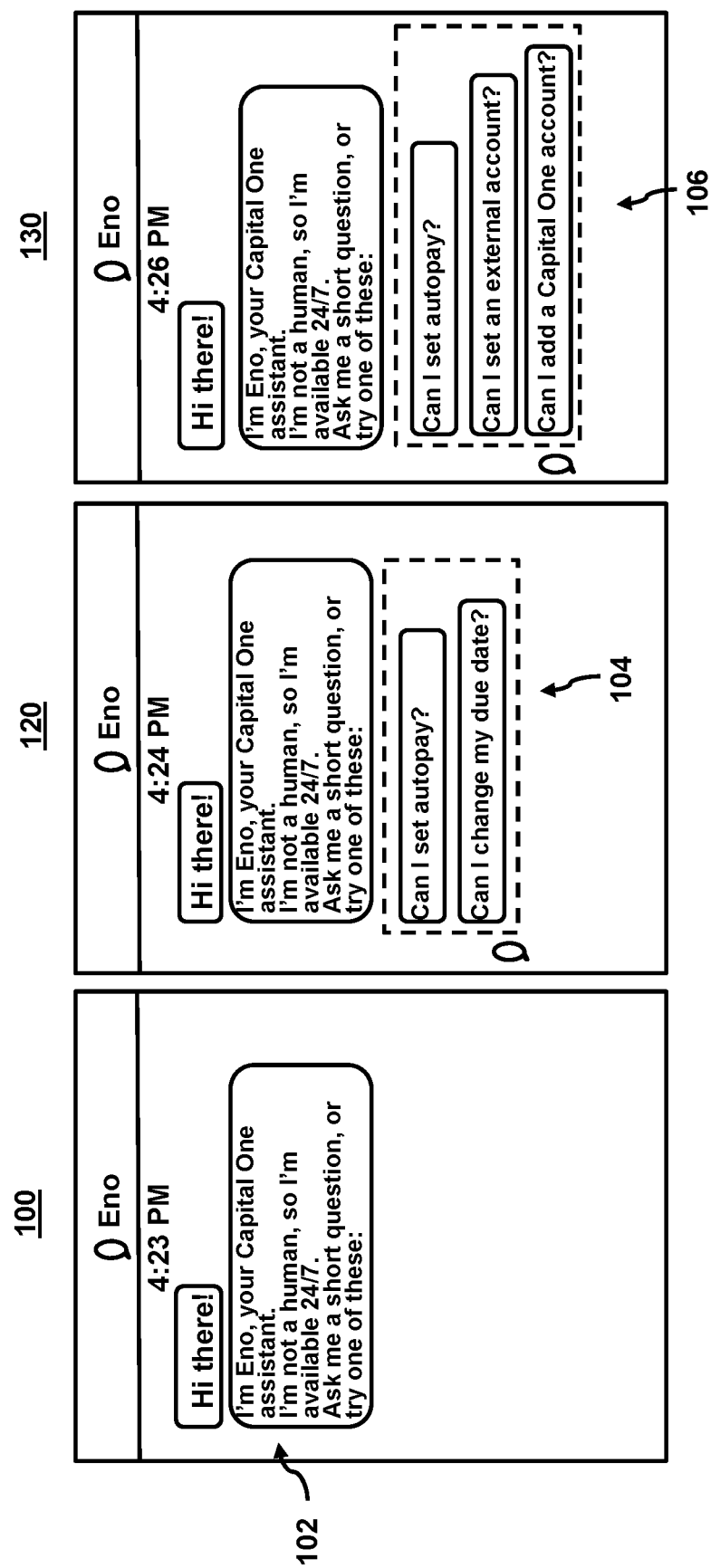
FIG. 1 shows an illustrative user interface for presenting dynamic conversational responses using machine learning models, in accordance with one or more embodiments.

FIG. 1 shows an illustrative user interface for presenting dynamic conversational responses using machine learning models, in accordance with one or more embodiments. For example, FIG. 1 shows user interfaces 100, 120, and 130. The system (e.g., a mobile application) may generate and respond to user interactions in the user interfaces (e.g., user interfaces 100, 120, and 130) in order to engage in a conversational interaction with the user. The conversational interaction may include a back-and-forth exchange of ideas and information between the system and the user. The conversational interaction may proceed through one or more mediums (e.g., text, video, audio, etc.).

The system may receive a first user action (e.g., user action 102) from a first user, during a conversational interaction with a user interface. The system may then monitor for a second user action during the conversational interaction with the user interface. While monitoring for the second user action, the system may determine a first length of time since the first user action. For example, as shown in FIG. 1, the system may be continuously determining a length of time from the first action. As the length increases, the system may generate different conversational responses. For example, as shown in user interface 120, which occurs a minute after user action 102 (e.g., at "4:24 PM"), the system generates response 104. However, as shown in user interface 130, which occurs three minutes after user action 102 (e.g., at "4:26 PM"), the system generates response 106. In some embodiments, the responses may be based on feature inputs inputted into a machine learning model as described in FIG. 3 below.

For example, the system may determine optimal responses based on the time between user actions. This system may determine this for a given person or population (e.g., a group of users). Accordingly, the system may generate different numbers of responses, at different time intervals, and/or with different content depending on a given person or that person belonging to a given population. For example, the system may use time to determine the number of different conversational responses that are shown at one time to a user or the intervals at which the conversational response (or a new conversational response) is shown. For example, some users may prefer one fewer conversational response in a given time interval while others prefer more. Moreover, the system may determine the number and time interval that allows a given user to reach a given response (e.g., the last response of a conversational interaction) and determine the different numbers of responses, different time intervals, and/or different content that achieves this, even if it conflicts with the preferences of a user.

For example, in order to maintain the conversational interaction, the system may need to generate response (e.g., conversational response) dynamically and/or in substantially real-time. For example, the system may generate responses within the normal cadence of a conversation. In some embodiments, the system may continually determine a likely intent of the user in order to generate responses (e.g., in the form of prompts, notifications, and/or other communications) to the user.

For example, in response to a user action, which in some embodiments may comprise a user logging onto an application that generates user interface 100, inputting a query (e.g., user action 102) into user interface 100, and/or a prior action (or lack thereof) by a user to a prior response generated by the system, the system may take one or more steps to generate dynamic conversational responses. These steps may include retrieving data about the user, retrieving data from other sources, monitoring user actions, and/or other steps in order to generate a feature input (e.g., as discussed below).

In some embodiments, the feature input may include a vector that describes various information about a user, a user action, and/or a current or previous interaction with the user. The system may further select the information for inclusion in the feature input based on a predictive value. The information may be collected actively or passively by the system and compiled into a user profile.

In some embodiments, the information (e.g., a user action) may include conversation details such as information about a current session, including a channel or platform, e.g., desktop web, iOS, mobile, a launch page (e.g., the webpage that the application was launched from), a time of launch, activities in a current or previous session before launching the application. The system may store this information and all the data about a conversational interaction may be available in real-time via HTTP messages and/or through data streaming from more or more sources (e.g., via an API.).

In some embodiments, the information (e.g., a user action) may include user account information such as types of accounts the user has, other accounts on file such as bank accounts for payment, information associated with accounts such as credit limit, current balance, due date, recent payments, recent transactions. The system may obtain this data in real-time for model prediction through enterprise APIs.

In some embodiments, the information (e.g., a user action) may include insights about users, provided to the application (e.g., via an API) from one or more sources such as a qualitative or quantitative representations (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

Figure 2:
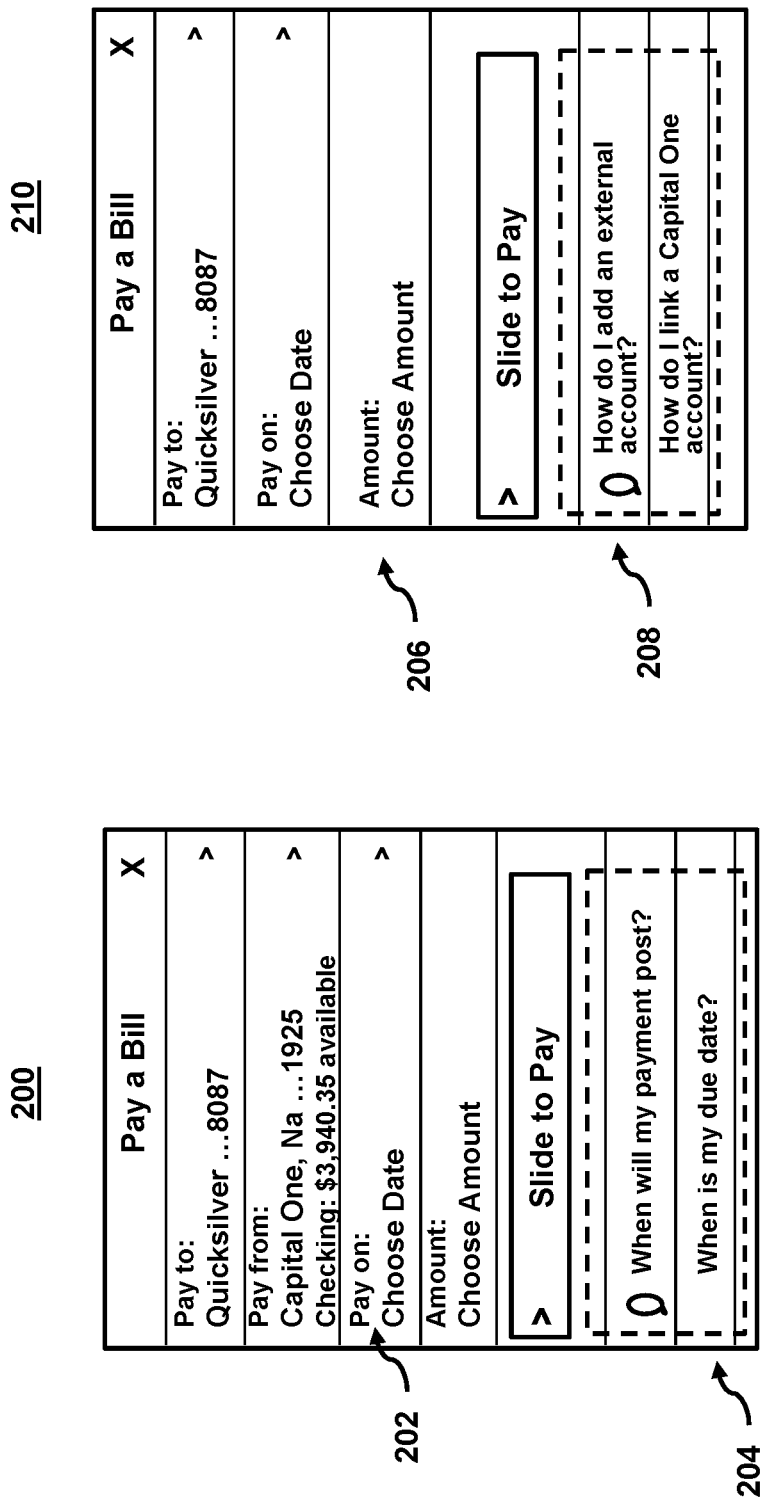
FIG. 2 shows an illustrative user interface for presenting dynamic conversational responses using learning models, in accordance with one or more embodiments.

FIG. 2 shows an illustrative user interface for presenting dynamic conversational responses using machine learning models, in accordance with one or more embodiments. For example, FIG. 2 shows user interfaces 200 and 210. The system (e.g., a mobile application) may generate and respond to user interactions in the user interfaces (e.g., user interfaces 200 and 210) in order to engage in a conversational interaction with the user. The conversational interaction may include a back-and-forth exchange of ideas and information between the system and the user. The conversational interaction may proceed through one or more mediums (e.g., text, video, audio, etc.). The system may additionally use information about where in the user interface a user previously interacted in order to improve the conversational interaction by both customizing conversational response to this information as well as generate conversational responses in positions in the user interface based on this information.

User interface 200 includes a plurality of different positions, each associated with different metadata, functions, and/or user actions. For example, user actions may be performed through direct manipulation of the graphical elements in user interface 200 such as selecting on an icon, entering textual information as a search field, etc. Moreover, in some embodiments, the system may receive user actions (or detect user inactions as discussed in FIG. 1 above) by monitoring for, but not detecting, direct manipulations.

In such cases, the position in the user interface of the direct manipulation (or an area currently highlighted, and/or last interacted with) may be detected, and the system may generate the conversational response based on that position. For example, the system may determine a first user interface position of the first user action in the user interface. The system may then retrieve metadata related to the first user interface position.

The metadata may describe a position, function, feature, type of response, data used for the response, and/or other characteristic of the position. For example, the metadata may indicate that this position corresponds to a field in which a date is entered. The system may then modify the conversation response (or a feature input used to generate the conversational response) based on this information. For example, the system may determine that, based on the field corresponding to a data, a conversational response that is selected must also correspond to the data. In some embodiments, the system may also use other metadata. For example, the system may retrieve metadata that is unrelated to a current conversation response. Additionally or alternatively, the feature input may be based on metadata associated with any conversation response, user account, and/or activity context data that is related to a current user interface, in order to ensure the quality of the conversation responses. For example, the system may use metadata related to a location, time, event, device setting, etc. In some embodiments, the system may receive a first labeled feature input, wherein the first labeled feature input is labeled with a known dynamic conversational response for the first labeled feature input and train the first machine learning model to classify the first labeled feature input with the known dynamic conversational response based on contextual metadata related to the conversational interaction with the user interface.

For example, in user interface 200, the system may detect that the user action corresponds to option 202. In response, the system may generate conversational responses 204. The location, content, or method of determination of conversational responses 204 may be based on metadata associated with option 202. For example, as the metadata for option 202 indicated that the option related to a pay date, the system may retrieve user account information prior to generating the feature input and/or conversational response indicating a type of information (e.g., to be presented, to be used to determine the content, position, and method of determination for the conversational response) and/or information related to a user or users (e.g., a pay date of the user). The system may then determine a feature input and/or conversational response based on this information.

In another example, in user interface 210, the system may detect that the user action corresponds to option 206. In response, the system may generate conversational responses 208. The location, content, or method of determination of conversational responses 208 may be based on metadata associated with option 206. For example, as the metadata for option 206 indicated that the option related to a user account, the system may retrieve user account information prior to generating the feature input and/or conversational response. The feature input and/or conversational response may then be based on this information.

In some embodiments, the system may further determine a position of a conversation response on the user interface based on the position. For example, the system may select a second user interface position for generating the dynamic conversational response based on the first user interface position. For example, in response to detecting that the user last interacted with a given window in the user interface, the system may generate for display, a conversational response in the window. In such cases, the boundaries of the second user interface position may be located, wholly or in part, within boundaries of the first user interface position.

Figure 3:
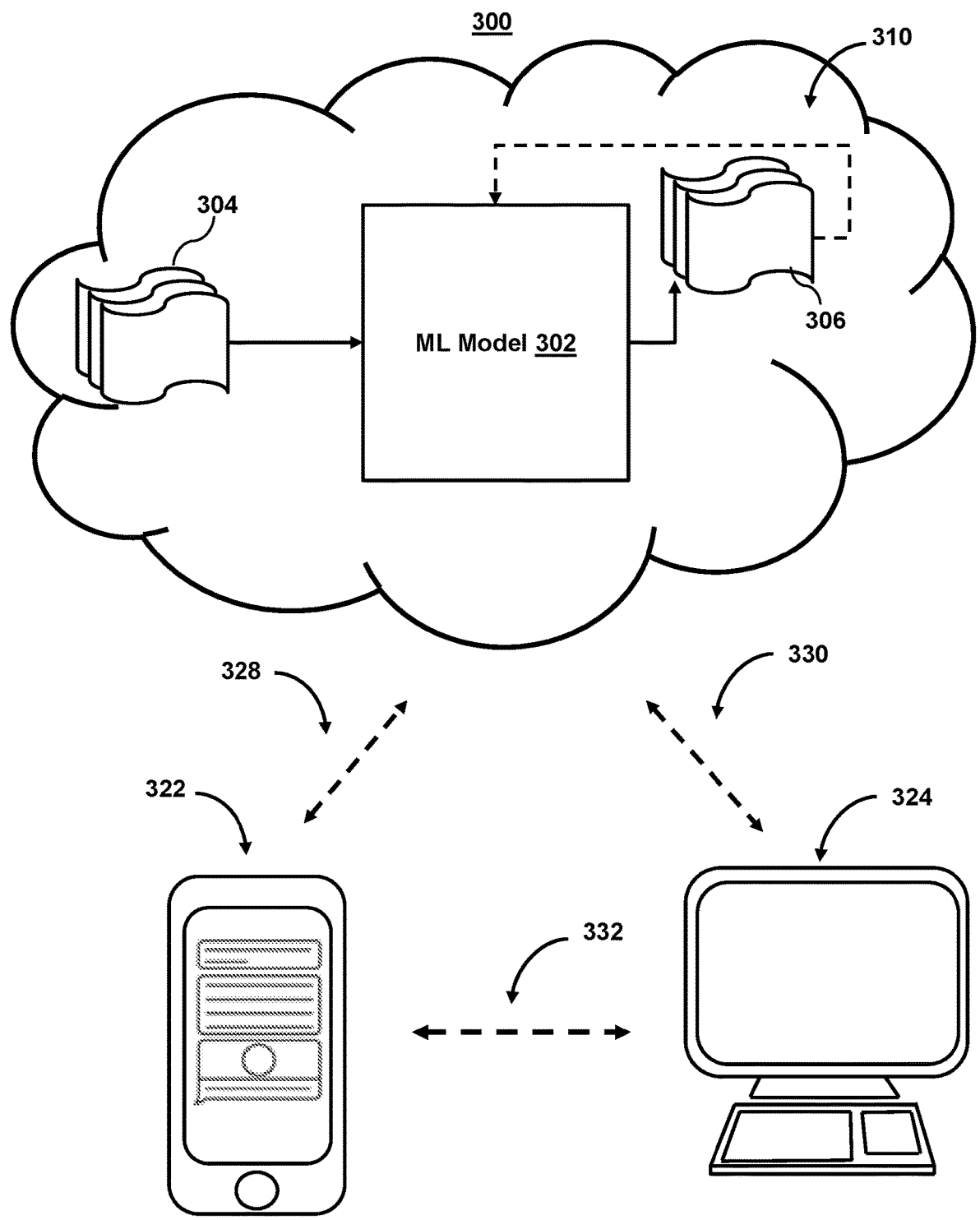
FIG. 3 is an illustrative system for generating dynamic conversational responses using two-tier machine learning models, in accordance with one or more embodiments.

FIG. 3 is an illustrative system for generating dynamic conversational responses using two-tier machine learning models, in accordance with one or more embodiments. For example, system 300 may represent the components used for generating dynamic conversational responses as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted, that while one or more operations are described herein as being performed by particular components of system 300, those operations may, in some embodiments, be performed by other components of system 300. As an example, while one or more operations are described herein as being performed by components of mobile device 322, those operations, may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., based on recommended contact strategies).

Additionally, as mobile device 322 and user terminal 324 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational responses using machine learning models.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 4G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior transactions. Alternatively, or additionally, the system may act as a clearing house for multiple sources of information about the user. Cloud components 310 may also include control circuitry configured to perform the various operations needed to generate recommendations. For example, the cloud components 310 may include cloud-based storage circuitry configured to store a first machine learning model that is trained to select a dynamic conversational response from a plurality of dynamic conversational responses based a first feature input. Cloud components 310 may also include cloud-based control circuitry configured to determine an intent of the user based on a machine learning model. Cloud components 310 may also include cloud-based input/output circuitry configured to generate the dynamic conversational response during a conversational interaction.

Cloud components 310 includes machine learning model 302. Machine learning model 302 may take inputs 304 and provide outputs 306. The inputs may include multiple datasets such as a training dataset and a test dataset. Each of the plurality of datasets (e.g., inputs 304) may include data subsets related to user data, contact strategies, and results. In some embodiments, outputs 306 may be fed back to machine learning model 302 as input to train machine learning model 302 (e.g., alone or in conjunction with user indications of the accuracy of outputs 306, labels associated with the inputs, or with other reference feedback information). For example, the system may receive a first labeled feature input, wherein the first labeled feature input is labeled with a known dynamic conversational response for the first labeled feature input. The system may then train the first machine learning model to classify the first labeled feature input with the known dynamic conversational response.

In another embodiment, machine learning model 302 may update its configurations (e.g., weights, biases, or other parameters) based on the assessment of its prediction (e.g., outputs 306) and reference feedback information (e.g., user indication of accuracy, reference labels, or other information). In another embodiment, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

In some embodiments, machine learning model 302 may include an artificial neural network (e.g., as described in FIG. 3 below). In such embodiments, machine learning model 302 may include an input layer and one or more hidden layers. Each neural unit of machine learning model 302 may be connected with many other neural units of machine learning model 302. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass before it propagates to other neural units. Machine learning model 302 may be self-learning and trained, rather than explicitly programmed, and can perform significantly better in certain areas of problem solving, as compared to traditional computer programs. During training, an output layer of machine learning model 302 may correspond to a classification of machine learning model 302 and an input known to correspond to that classification may be input into an input layer of machine learning model 302 during training. During testing, an input without a known classification may be input into the input layer, and a determined classification may be output.

In some embodiments, machine learning model 302 may include multiple layers (e.g., where a signal path traverses from front layers to back layers). In some embodiments, back propagation techniques may be utilized by machine learning model 302 where forward stimulation is used to reset weights on the "front" neural units. In some embodiments, stimulation and inhibition for machine learning model 302 may be more free-flowing, with connections interacting in a more chaotic and complex fashion. During testing, an output layer of machine learning model 302 may indicate whether or not a given input corresponds to a classification of machine learning model 302 (e.g., whether a first length of time corresponds to lengths of programming time for previously completed stories by contributors without a required skill).

In some embodiments, model 302 may predict a goal or intent of a user. This goal or intent may be selected from a plurality of goals and/or intents stored by the system. For example, the system may determine that users who ask different questions about payment have similar account information and digital activities. The system may further determine that the users tend to be different from those of users who have a one-off type request, such as lost card reports or travel notification. In some embodiments, the model (e.g., model 302) may automatically perform actions based on output 306. In some embodiments, the model (e.g., model 302) may not perform any actions on a user's account. The output of the model (e.g., model 302) is only used to decide which dynamic conversational responses to display to a user.

Figure 4:
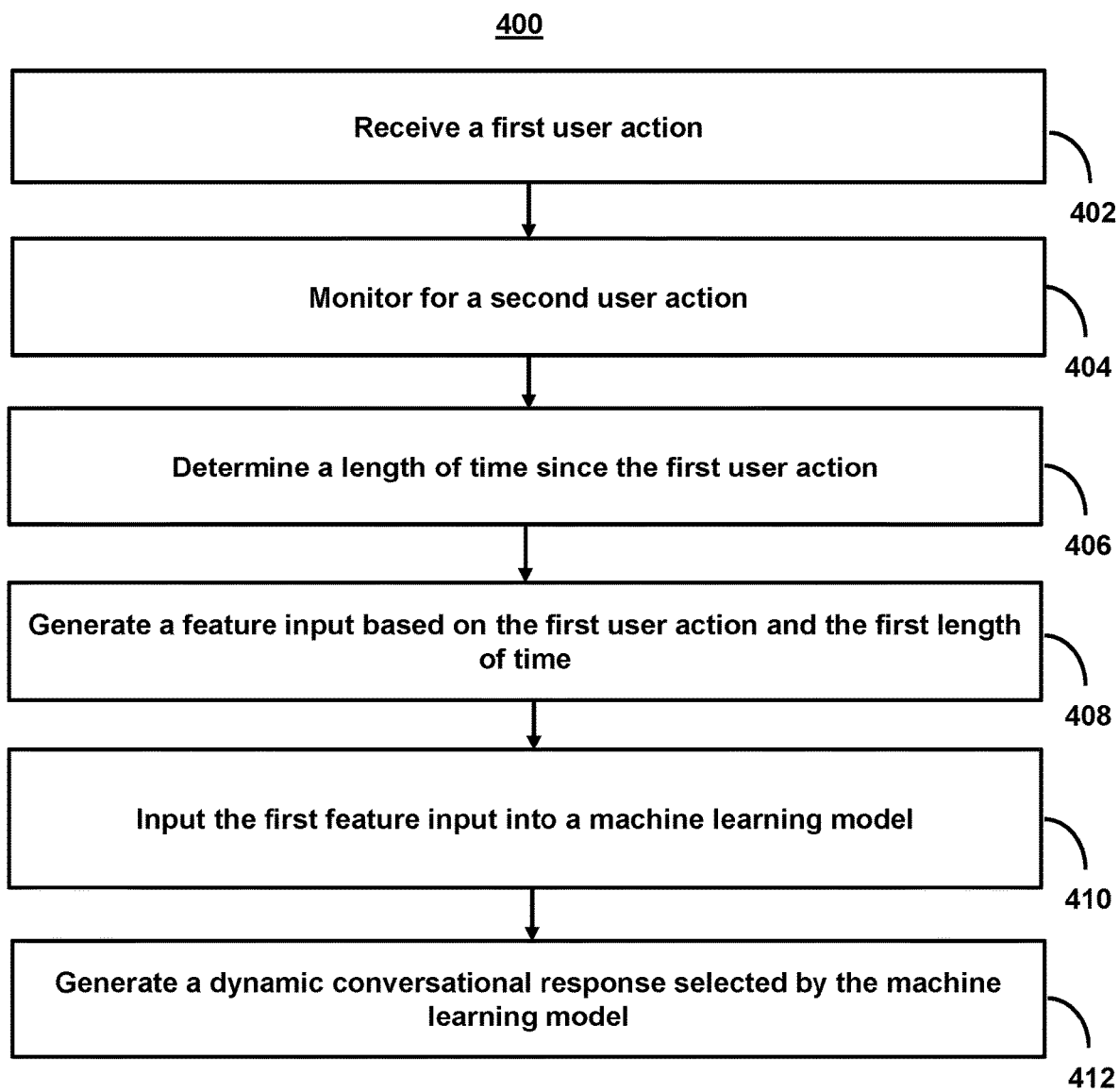
FIG. 4 shows a flowchart of the steps involved in generating dynamic conversational responses using a machine learning model, in accordance with one or more embodiments.

FIG. 4 shows a flowchart of the steps involved in generating dynamic conversational responses using a machine learning model, in accordance with one or more embodiments. For example, process 400 may represent the steps taken by one or more devices as shown in FIGS. 1-2 when generating dynamic conversational responses using two-tier machine learning models (e.g., as shown in FIG. 3). For example, the system may use a first tier of machine learning models to determine the theme or topic of a question that the user has but not the actual question itself, while the second tier is used to determine the actual question that the user has.

At step 402, process 400 (e.g., using one or more components in system 300 (FIG. 3)) receives a first user action. For example, the system may receive, using control circuitry, a first user action, from a first user, during a conversational interaction with a user interface. For example, the system may receive a user action as described in FIGS. 1-2.

At step 404, process 400 (e.g., using one or more components in system 300 (FIG. 3)) monitors for a second user action. For example, the system may monitor for, using the control circuitry, a second user action during the conversational interaction with the user interface. For example, the system may actively or passively monitor for one or more user actions.

In some embodiments, the system may monitor for one or more other user actions and/or user action types. For example, in response to detecting the third user action, the system may determine a result of the first user action (e.g., a user input value, an account balance as a result of the user action, etc.). The system may then generate a second feature input based on the result. The system may then input the second feature input into a second machine learning model, wherein the second machine learning model is trained to determine a level of variance of the result from prior results of prior user actions. For example, the system may determine if the result of the user action (e.g., a resulting account value) corresponds to a normal account level of the user. The system may then compare the level of variance to a threshold level. In response to the level of variance exceeding the threshold, the system may generate, at the user interface, a push notification (and/or other communication) based on the level of variance.

At step 406, process 400 (e.g., using one or more components in system 300 (FIG. 3)) determines a length of time since the first user action. For example, the system may, while monitoring for the second user action, determine, using the control circuitry, a first length of time since the first user action. In some embodiments, the system may also monitor for, generate feature inputs on, and/or determine other features for use in generating conversational responses. For example, the system may determine a first user interface position of the first user action in the user interface. The system may then retrieve metadata related to the first user interface position, wherein the first feature input is further based on the metadata. For example, the metadata may describe a feature or function associated with that position of the user interface. Additionally, or alternatively, the system may select a second user interface position for generating the dynamic conversational response based on the first user interface position. For example, the system may generate a conversational response at the same position as where a user action was entered and/or a position currently highlighted by a user. In some embodiments, boundaries of the second user interface position are located within boundaries of the first user interface position. For example, if a user is interacting with a menu in a window of a user interface, the system may generate conversational responses within the menu.

At step 408, process 400 (e.g., using one or more components in system 300 (FIG. 3)) generates a feature input based on the first user action and the first length of time. For example, the system may generate, using the control circuitry, a first feature input based on the first user action and the first length of time.

At step 410, process 400 (e.g., using one or more components in system 300 (FIG. 3)) inputs the first feature input into a machine learning model. For example, the system may input, using the control circuitry, the first feature input into a first machine learning model, wherein the first machine learning model is trained to select a dynamic conversational response from a plurality of dynamic conversational responses based on the first feature input.

At step 412, process 400 (e.g., using one or more components in system 300 (FIG. 3)) generates a dynamic conversational response selected by the machine learning model. For example, the system may generate, at the user interface, the dynamic conversational response selected by a machine learning model during the conversational interaction.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one of more of the steps in FIG. 4.

Figure 5:
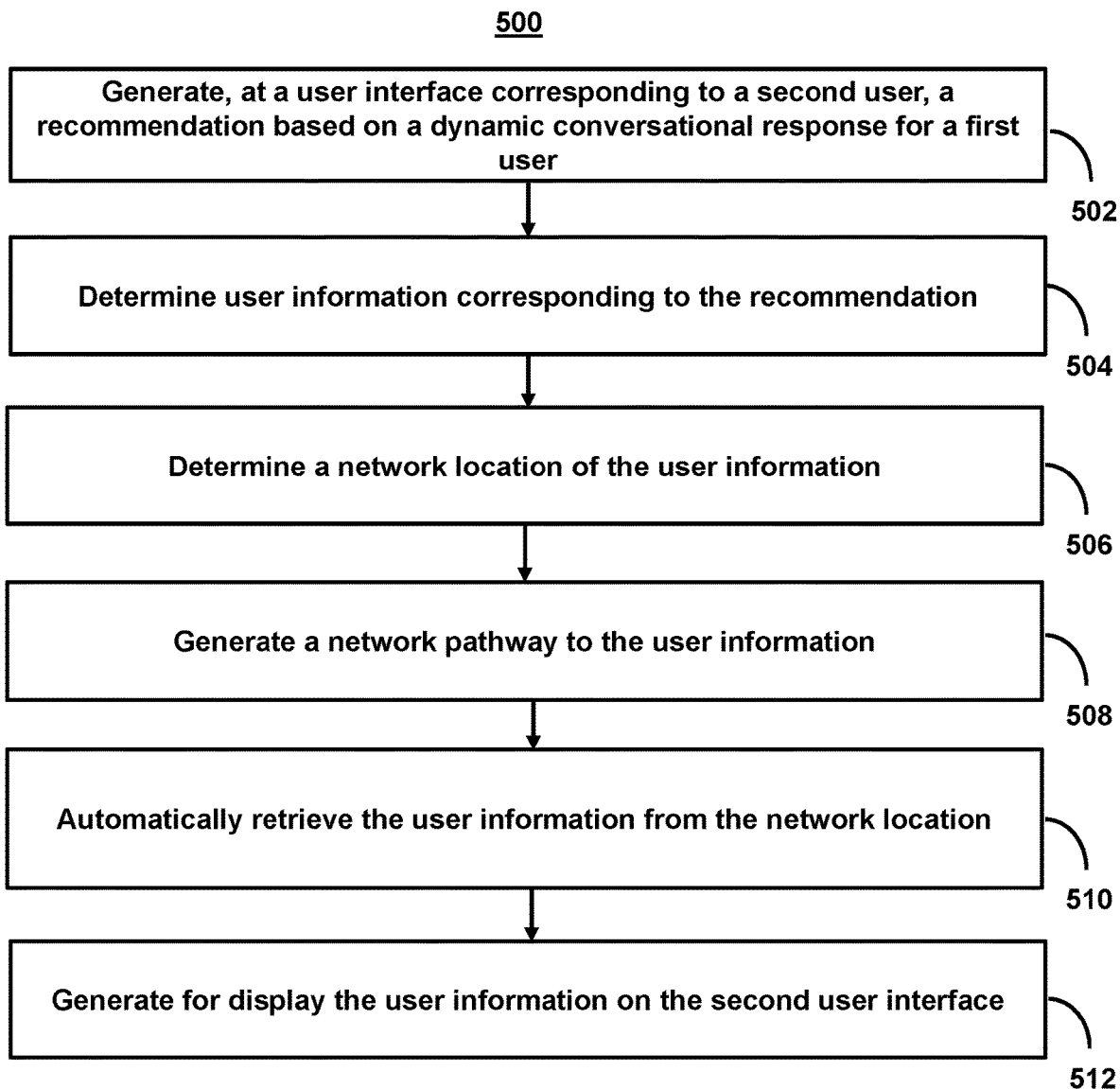
FIG. 5 shows a flowchart of the steps involved in generating user information on a second user interface based on a user actions on a first user interface, in accordance with one or more embodiments.

FIG. 5 shows a flowchart of the steps involved in generating user information on a second user interface based on a user actions on a first user interface, in accordance with one or more embodiments. For example, process 500 may represent the steps taken by one or more devices, as shown in FIGS. 1-3, when generating a user information. For example, in some embodiments, a user may end a conversational interaction with an application generating dynamic conversational responses (e.g., a mobile application). The user may then contact (e.g., via the same or a different platform) another user. The other user may (e.g., be a service representative associated with a provider of the application. In order to improve the conversational interaction between the first and second user, the system may provide recommendation to the second user about potential questions that the first user may have. Additionally or alternatively, the system may location information in the system of the second user, determine a network pathway to quickly and efficiently retrieve this information, and/or pre-fetch this information. In each case, the system may more efficiently (and in less time) obtain relevant information that may inform the second user about potential questions of the first user. Thus, the conversational interaction between the first and second user may be improved.

At step 502, process 500 (e.g., using one or more components in system 300 (FIG. 3)) generates, at a user interface corresponding to a second user, a recommendation based on a dynamic conversational response for a first user. For example, the system may, in response to detecting user action, monitor for another user action, wherein the other user action is not received via the user interface, and wherein the other user action corresponds to a first user contacting a second user. In response to detecting the other user action, the system may generate, at a second user interface corresponding to the second user, a recommendation based on the dynamic conversational response selected by the machine learning model.

At step 504, process 500 (e.g., using one or more components in system 300 (FIG. 3)) determines user information corresponding to the recommendation. For example, the system may determine user information corresponding to the recommendation at the first user interface.

At step 506, process 500 (e.g., using one or more components in system 300 (FIG. 3)) determines a network location of the user information. For example, the system may determine a network location of the user information (e.g., on a network associated with the second user interface).

At step 508, process 500 (e.g., using one or more components in system 300 (FIG. 3)) generates a network pathway to the user information. For example, the system may generate a network pathway (e.g., on the network associated with the second user interface) to the user information.

At step 510, process 500 (e.g., using one or more components in system 300 (FIG. 3)) automatically retrieves the user information from the network location. For example, the system may automatically retrieve the user information from the network location in response to the other user action.

At step 512, process 500 (e.g., using one or more components in system 300 (FIG. 3)) generates for display the user information on the second user interface. For example, the system may generate for display the user information on the second user interface of a second user, wherein the second user interface is located remotely from the first user interface.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic conversational responses using machine learning models, the method comprising: receiving a first user action, from a first user, during a conversational interaction with a user interface; monitoring for a second user action during the conversational interaction with the user interface; while monitoring for the second user action, determining a first length of time since the first user action; generating a first feature input based on the first user action and the first length of time; inputting the first feature input into a first machine learning model, wherein the first machine learning model is trained to select a dynamic conversational response from a plurality of dynamic conversational responses based the first feature input; and generating, at the user interface, the dynamic conversational response selected by a machine learning model during the conversational interaction.
2. The method of embodiment 1, further comprising: determining a first user interface position of the first user action in the user interface; and retrieving metadata related to the first user interface position, wherein the first feature input is further based on the metadata.

3. The method of embodiment 2, further comprising selecting a second user interface position for generating the dynamic conversational response based on the first user interface position.
4. The method of embodiment 3, wherein boundaries of the second user interface position are located within boundaries of the first user interface position.
5. The method of embodiment 1, further comprising while monitoring for the second user action, monitoring for a third user action during the conversational interaction with the user interface, wherein the third user action corresponds to a user-initiated end to the conversational interaction.
6. The method of embodiment 5, further comprising: in response to detecting the third user action, determining a result of the first user action; generating a second feature input based on the result; inputting the second feature input into a second machine learning model, wherein the second machine learning model is trained to determine a level of variance of the result from prior results of prior user actions; and generating, at the user interface, a push notification based on the level of variance.
7. The method of embodiment 5 or 6, further comprising: in response to detecting the third user action, monitoring for a fourth user action, wherein the fourth user action is not received via the user interface, and wherein the fourth user action corresponds to the first user contacting a second user; in response to detecting the fourth user action, generating, at a second user interface corresponding to the second user, a recommendation based on the dynamic conversational response selected by the machine learning model.
8. The method of embodiment 7, further comprising: determining user information corresponding to the recommendation; determining a network location of the user information; and generating a network pathway to the user information.
9. The method of embodiment 8, further comprising: automatically retrieving the user information from the network location in response to the fourth user action; and generating for display the user information on the second user interface.
10. The method of any one of embodiments 1-9, further comprising: receiving a first labeled feature input, wherein the first labeled feature input is labeled with a known dynamic conversational response for the first labeled feature input; and training the first machine learning model to classify the first labeled feature input with the known dynamic conversational response.
11. A tangible, non-transitory, machine-readable medium storing instructions that, when executed by a data processing apparatus, cause the data processing apparatus to perform operations comprising those of any of embodiments 1-10.
12. A system comprising: one or more processors; and memory storing instructions that, when executed by the processors, cause the processors to effectuate operations comprising those of any of embodiments 1-10.
13. A system comprising means for performing any of embodiments 1-10.

What is claimed is:
1. A system for generating dynamic conversational responses using machine learning models, the system comprising:
storage circuitry configured to store a first machine learning model that is trained to:
determine predetermined numbers of dynamic conversational responses for simultaneously displaying in user interfaces in response to user actions; and
select subsets of dynamic conversational responses from a plurality of dynamic conversational responses, wherein a number of dynamic conversational responses in the subsets match the predetermined numbers, and wherein each dynamic conversational response in the subsets corresponds to inputted user actions, inputted lengths of time, and metadata;
control circuitry configured to:
receive a first user action, from a first user, during a conversational interaction with a user interface;
determine a first user interface position of the first user action in the user interface;
retrieve metadata related to the first user interface position;
monitor for a second user action during the conversational interaction with the user interface;
determine a first length of time since the first user action while monitoring for the second user action;
generate a first feature input based on the first user action, the first length of time, and the metadata; and
input the first feature input into the first machine learning model; and
input/output circuitry configured to:
simultaneously generate, at the user interface, a subset of dynamic conversational responses that corresponds to the first user action, second user action, and the first length of time.
2. A method for generating dynamic conversational responses using machine learning models, the method comprising:
receiving a first user action, from a first user, during a conversational interaction with a user interface;
determining a first user interface position of the first user action in the user interface;
retrieving metadata related to the first user interface position;
monitoring for a second user action during the conversational interaction with the user interface;
while monitoring for the second user action, determining a first length of time since the first user action;
generating a first feature input based on the first user action, the metadata, and the first length of time;
inputting the first feature input into a first machine learning model, wherein the first machine learning model is trained to determine predetermined numbers of dynamic conversational responses and select subsets of dynamic conversational responses;
selecting a subset of dynamic conversational responses from a plurality of dynamic conversational responses, wherein a number of dynamic conversational responses in the subset match a predetermined number, and wherein each dynamic conversational response in the subset corresponds to the first user action, the second user action, and the first length of time; and
simultaneously generating, at the user interface, the subset.
3. The method of claim 2, further comprising selecting a second user interface position for generating a dynamic conversational response based on the first user interface position.
4. The method of claim 3, wherein boundaries of the second user interface position are located within boundaries of the first user interface position.

5. The method of claim 2, further comprising while monitoring for the second user action, monitoring for a third user action during the conversational interaction with the user interface, wherein the third user action corresponds to a user-initiated end to the conversational interaction.

6. The method of claim 5, further comprising:
in response to detecting the third user action, determining a result of the first user action;
generating a second feature input based on the result;
inputting the second feature input into a second machine learning model, wherein the second machine learning model is trained to determine a level of variance of the result from prior results of prior user actions; and
generating, at the user interface, a push notification based on the level of variance.

7. The method of claim 5, further comprising:
in response to detecting the third user action, monitoring for a fourth user action, wherein the fourth user action is not received via the user interface, and wherein the fourth user action corresponds to the first user contacting a second user; and
in response to detecting the fourth user action, generating, at a second user interface corresponding to the second user, a recommendation based on a dynamic conversational response selected by the second machine learning model.

8. The method of claim 7, further comprising:
determining user information corresponding to the recommendation;
determining a network location of the user information; and
generating a network pathway to the user information.

9. The method of claim 8, further comprising:
automatically retrieving the user information from the network location in response to the fourth user action; and
generating for display the user information on the second user interface.

10. A non-transitory, computer-readable medium for generating dynamic conversational responses using machine learning models, comprising instructions that, when executed by one or more processors, cause operations comprising:
receiving a first user action, from a first user, during a conversational interaction with a user interface;
determining a first user interface position of the first user action in the user interface;
retrieving metadata related to the first user interface position;
monitoring for a second user action during the conversational interaction with the user interface;
while monitoring for the second user action, determining a first length of time since the first user action;
generating a first feature input based on the first user action, the metadata, and the first length of time;
inputting the first feature input into a first machine learning model, wherein the first machine learning model is trained to determine predetermined numbers of dynamic conversational responses and select subsets of dynamic conversational responses;
selecting a subset of dynamic conversational responses from a plurality of dynamic conversational responses, wherein a number of dynamic conversational responses in the subset match a predetermined number, and wherein each dynamic conversational response in the subset corresponds to the first user action, the second user action, and the first length of time; and
simultaneously generating, at the user interface, the subset.

11. The non-transitory, computer-readable medium of claim 10, further comprising instructions that cause further operations comprising selecting a second user interface position for generating a dynamic conversational response based on the first user interface position, wherein boundaries of the second user interface position are located within boundaries of the first user interface position.

12. The non-transitory, computer-readable medium of claim 10, further comprising instructions that cause further operations comprising while monitoring for the second user action, monitoring for a third user action during the conversational interaction with the user interface, wherein the third user action corresponds to a user-initiated end to the conversational interaction.

13. The non-transitory, computer-readable medium of claim 12, further comprising instructions that cause further operations comprising:
in response to detecting the third user action, determining a result of the first user action; generating a second feature input based on the result;
inputting the second feature input into a second machine learning model, wherein the second machine learning model is trained to determine a level of variance of the result from prior results of prior user actions; and
generating, at the user interface, a push notification based on the level of variance.

14. The non-transitory, computer-readable medium of claim 13, further comprising instructions that cause further operations comprising:
in response to detecting the third user action, monitoring for a fourth user action, wherein the fourth user action is not received via the user interface, and wherein the fourth user action corresponds to the first user contacting a second user; and
in response to detecting the fourth user action, generating, at a second user interface corresponding to the second user, a recommendation based on a dynamic conversational response selected by the second machine learning model.

15. The non-transitory, computer-readable medium of claim 14, further comprising instructions that cause further operations comprising:
determining user information corresponding to the recommendation;
determining a network location of the user information; and
generating a network pathway to the user information.

16. The non-transitory, computer-readable medium of claim 15, further comprising instructions that cause further operations comprising:
automatically retrieving the user information from the network location in response to the fourth user action; and
generating for display the user information on the second user interface.

* * * * *